US010253872B2

(12) United States Patent
Riera et al.

(10) Patent No.: US 10,253,872 B2
(45) Date of Patent: Apr. 9, 2019

(54) DRIVER INTERFACE

(71) Applicant: Ford Global Technologies, LLC, Dearborn, MI (US)

(72) Inventors: Anthony Sebastian Riera, Sterling Heights, MI (US); Edwin D. Robertson, Monroe, MI (US); Charles William Suter, South Lyon, MI (US); Majed Samhan Mohammed, LaSalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 15/136,212

(22) Filed: Apr. 22, 2016

(65) Prior Publication Data

US 2017/0307069 A1    Oct. 26, 2017

(51) Int. Cl.
| | |
|---|---|
| *F16H 61/02* | (2006.01) |
| *F16H 59/02* | (2006.01) |
| *F16H 61/16* | (2006.01) |
| *F16H 63/42* | (2006.01) |
| *F16H 59/08* | (2006.01) |

(52) U.S. Cl.
CPC ..... *F16H 61/0248* (2013.01); *F16H 59/0204* (2013.01); *B60Y 2300/18041* (2013.01); *F16H 2059/0221* (2013.01); *F16H 2059/0247* (2013.01); *F16H 2059/0256* (2013.01); *F16H 2059/088* (2013.01); *F16H 2061/165* (2013.01); *F16H 2063/426* (2013.01); *F16H 2312/09* (2013.01)

(58) Field of Classification Search
None
See application file for complete search history.

(56) References Cited

U.S. PATENT DOCUMENTS

| | | | | |
|---|---|---|---|---|
| 5,683,322 A | * | 11/1997 | Meyerle | B60T 1/093 |
| | | | | 475/72 |
| 6,295,887 B1 | * | 10/2001 | DeJonge | B60K 37/06 |
| | | | | 477/99 |
| 6,439,073 B2 | * | 8/2002 | Ohashi | F16H 59/0204 |
| | | | | 74/335 |
| 7,505,842 B2 | | 3/2009 | Luh | |
| 7,962,268 B2 | | 6/2011 | Cho | |
| 8,725,368 B2 | * | 5/2014 | Pudvay | F16H 59/12 |
| | | | | 701/51 |
| 9,139,094 B2 | | 9/2015 | Solà-Morales et al. | |
| 2004/0225430 A1 | * | 11/2004 | Bothe | F16H 59/0204 |
| | | | | 701/52 |
| 2006/0169085 A1 | * | 8/2006 | Peuster | B60K 37/06 |
| | | | | 74/473.12 |

(Continued)

*Primary Examiner* — Timothy Hannon
(74) *Attorney, Agent, or Firm* — David Kelley; Brooks Kushman P.C.

(57) ABSTRACT

A vehicle driver interface includes a mode selector, such as a shift lever, and two shift paddles. The shift paddles perform different functions according to which driving mode is selected via the mode selector. In a manual mode, driver activation of one of the shift paddles results in an upshifts and driver activation of the other shift paddle results in a downshift. In a snowplow mode, driver activation of one of the shift paddles shifts the transmission to reverse while driver activation of the other shift paddle shifts the transmission to forward.

11 Claims, 3 Drawing Sheets

(56) References Cited

U.S. PATENT DOCUMENTS

| | | | |
|---|---|---|---|
| 2007/0032338 A1* | 2/2007 | Damiani | B60W 30/18181 477/92 |
| 2007/0099756 A1* | 5/2007 | Saito | F16H 59/08 477/121 |
| 2008/0221760 A1* | 9/2008 | Wakamatsu | F16H 61/0213 701/52 |
| 2009/0189373 A1* | 7/2009 | Schramm | B60K 35/00 280/731 |
| 2012/0004818 A1* | 1/2012 | Wakita | F16H 59/0204 701/66 |
| 2014/0141935 A1* | 5/2014 | Huff | B60W 30/18027 477/174 |
| 2014/0149909 A1 | 5/2014 | Montes | |
| 2015/0198235 A1 | 7/2015 | Baumgartner | |
| 2015/0321551 A1* | 11/2015 | Hendry | B60K 20/06 701/62 |

\* cited by examiner

DRIVER INTERFACE

TECHNICAL FIELD

This disclosure relates to the field of vehicle/driver interfaces. More particularly, the disclosure pertains to a driver interface adapted for operations with frequent forward/reverse cycling.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Some transmissions have a collection of gearing and shift elements configured such that engaging various subsets of the shift elements establish various power flow paths between an input shaft and an output shaft. These various power flow paths are commonly referred to as gears even when they are not associated with a particular physical gearing element in the transmission. These various power flow paths establish different speed ratios between an input shaft and an output shaft. Automotive transmission typically provide multiple forward power flow paths with positive speed ratios and at least one reverse power flow path with a negative speed ratio. To change from one speed ratio to another speed ratio, one of more shift elements are disengaged and one or more shift elements are engaged in order to change which power flow path is utilized. A continuously variable transmission may implement a number of virtual gears to simulate operation of a step ratio transmission.

SUMMARY OF THE DISCLOSURE

A vehicle includes a transmission, a driver interface, and a controller. The transmission implements a reverse gear and multiple forward gears. The driver interface includes a mode selector, such as a shift lever, and two shift paddles, which may be located on opposite sides of the steering wheel. In a first mode, as indicated via the mode selector, the controller is programmed to respond to activation of the shift paddles by command shifts between the reverse gear and one of the forward gears. In a second mode, as indicated by the mode selector, the controller may be programmed to respond to activation of the shift paddles by commanding shifts among the forward gears.

A vehicle controller includes input channels, output channels, and control logic. The input channels receive signals from two shift paddles and a mode selector. The output channels send signals to a transmission. In a first mode, selected via the mode selector, the control logic responds to activation of the shift paddles by commanding the transmission to shift between a reverse gear and a forward gear. In a second mode, selected via the mode selector, the control logic may respond to activation of the shift paddles by commanding shifts among a plurality of forward gears.

A method of controlling a transmission includes operating in at least first and second driver selected modes. In the first driver selected mode, a controller commands shifts among a plurality of forward gears in response to activation of shift paddles. In the second driver selected mode, the controller commands shifts between one of the forward gears and a reverse gear in response to activation of the shift paddles. The controller may switch between the first and second modes in response to driver movement of a shift lever. In a third driver selected mode, the controller may command shifts among the plurality of forward gears in response to changes in a vehicle speed or an accelerator pedal position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In an automatic transmission, a controller determines which of the forward gears is appropriate for current driving conditions based on a shift schedule. The shift schedule may select a forward gear based on vehicle speed and accelerator pedal position, for example. When the driving conditions change such that a different forward gear is desirable, the controller sends commands to the transmission to execute a shift. The vehicle driver typically specifies the desired direction of movement using a mode selector such as a shift lever with positions for Park, Reverse, Neutral, and Drive (forward). For many vehicle applications, mode changes are relatively infrequent. However, for some applications, such as plowing snow, the driver must frequently alternate between reverse and forward. In some vehicles with automatic transmissions, the driver is provided with additional controls to specify a different forward gear than what is selected by the controller.

Figure 1:
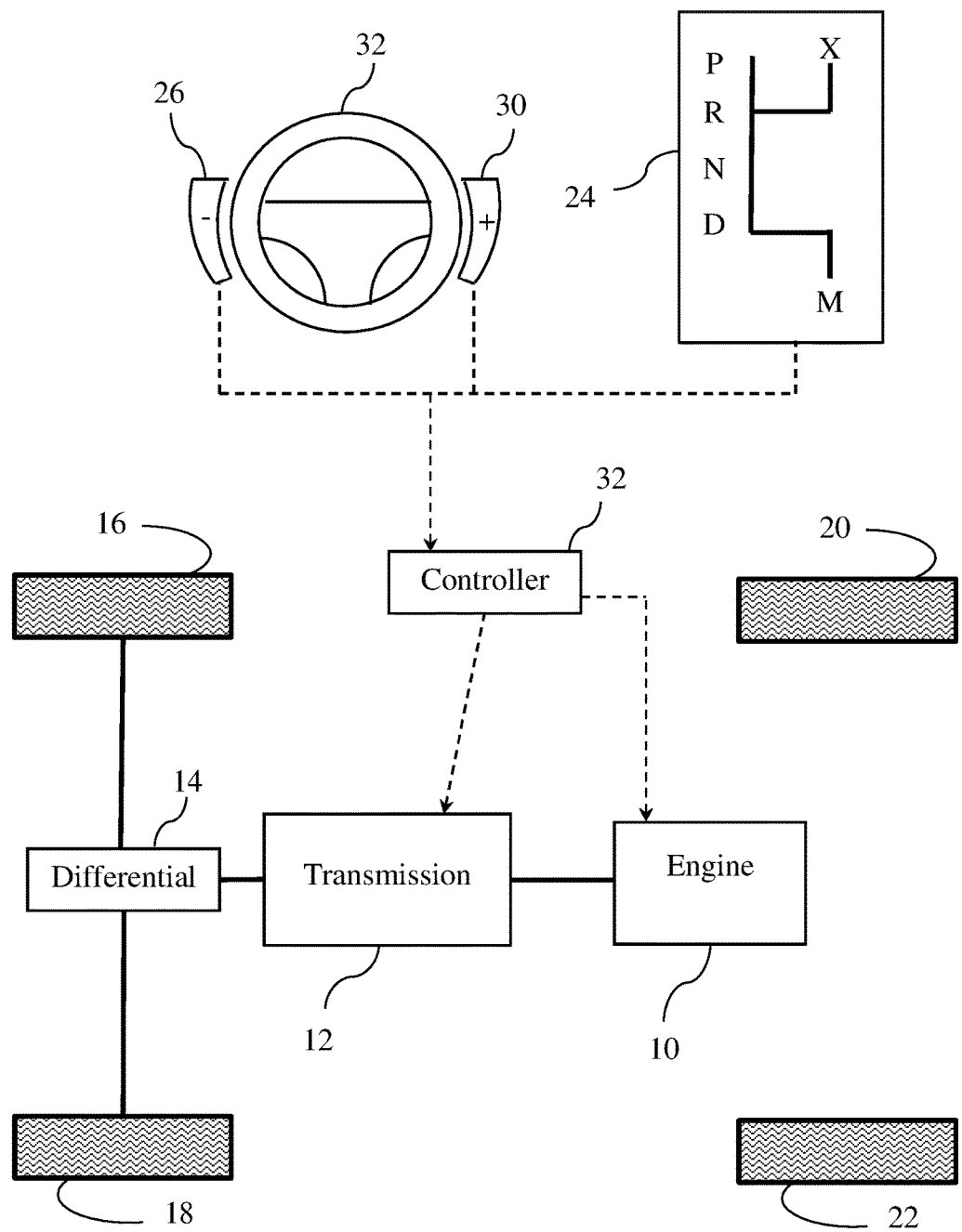
FIG. 1 is a schematic representation of a vehicle powertrain and selected user interface components.

FIG. 1 schematically illustrates a rear wheel drive vehicle powertrain and driver interface. Bold solid lines represent mechanical power flow connections such as shafts. Dashed lines represent the flow of information signals. For clarity, power flow paths and signals not impacted by the present invention may be omitted from FIG. 1. Engine 10 generates power by burning fuel. Transmission 12 establishes a variety of power flow paths with various speed and torque ratios between the engine crankshaft and a transmission output shaft to adapt the power to current vehicle needs. Differential 14 splits the power from the transmission output shaft between left and right rear wheels 16 and 18, permitting slight speed differences such as when the vehicle turns a corner. Front wheels 20 and 22 are not powered. A four wheel drive powertrain may include a transfer case which diverts some or all power from the transmission output shaft to the front wheels. A front wheel drive powertrain drives the front wheels as opposed to the rear wheels. In a front wheel drive powertrain, the transmission and differential may be combined into a single housing.

A driver controls the operation of the powertrain by interacting with various controls. The driver selects the desired direction of motion (or neutral) using a mode selector 24. The mode selector may be a shift lever with specific positions for Park (P), Reverse (R), Neutral (N), and Drive (D). Alternatively, the mode selector may be a rotary knob, a series of push buttons, or may be integrated with a graphical user interface. Additionally, the mode selector provides for selection of two additional modes M and X. In Manual (M) mode, the driver controls the selection of forward gears by activating shift paddles 26 and 28 located on opposite sides of steering wheel 30. As described in more detail below, the shift paddle on the left of the steering wheel may be a "– button" used to command a downshift and the shift paddle on the right of the steering wheel may be a "+ button" used to command an upshift. Locating the shift paddles close to the steering wheel permits a driver to activate the shift paddles without releasing his or her hands from the steering wheel. However, other locations and types of controls may be utilized as the – button and the + button. In X mode, as described in detail below, the shift paddles select forward and reverse. X mode is useful for operations such as snowplowing that require frequent changes of vehicle direction.

Controller 32 sends signals to control the engine and transmission based on driver manipulation of the controls list above and on other sensors. These other sensors may include, for example, a vehicle speed sensor, a transmission output speed sensor, ABS wheel speed sensors, a transmission range sensor, an accelerator pedal position sensor, and a brake pedal position sensor. Controller 32 may be implemented as a single microprocessor or as multiple communicating microprocessors.

The control algorithms are described below and in flow-charts. In the flow charts, control states are represented by rounded corner boxes. One state is active at a time. Various events trigger execution of actions as indicated by labelled arrows leading away from the state boxes. These events may be sent from sensors in response to driver actions or changes in vehicle status. Square corner boxes represent actions taken by the controller. Diamonds represent logic branch points. Event handling logic may result in a transition to another state but does not always do so.

Figure 2:
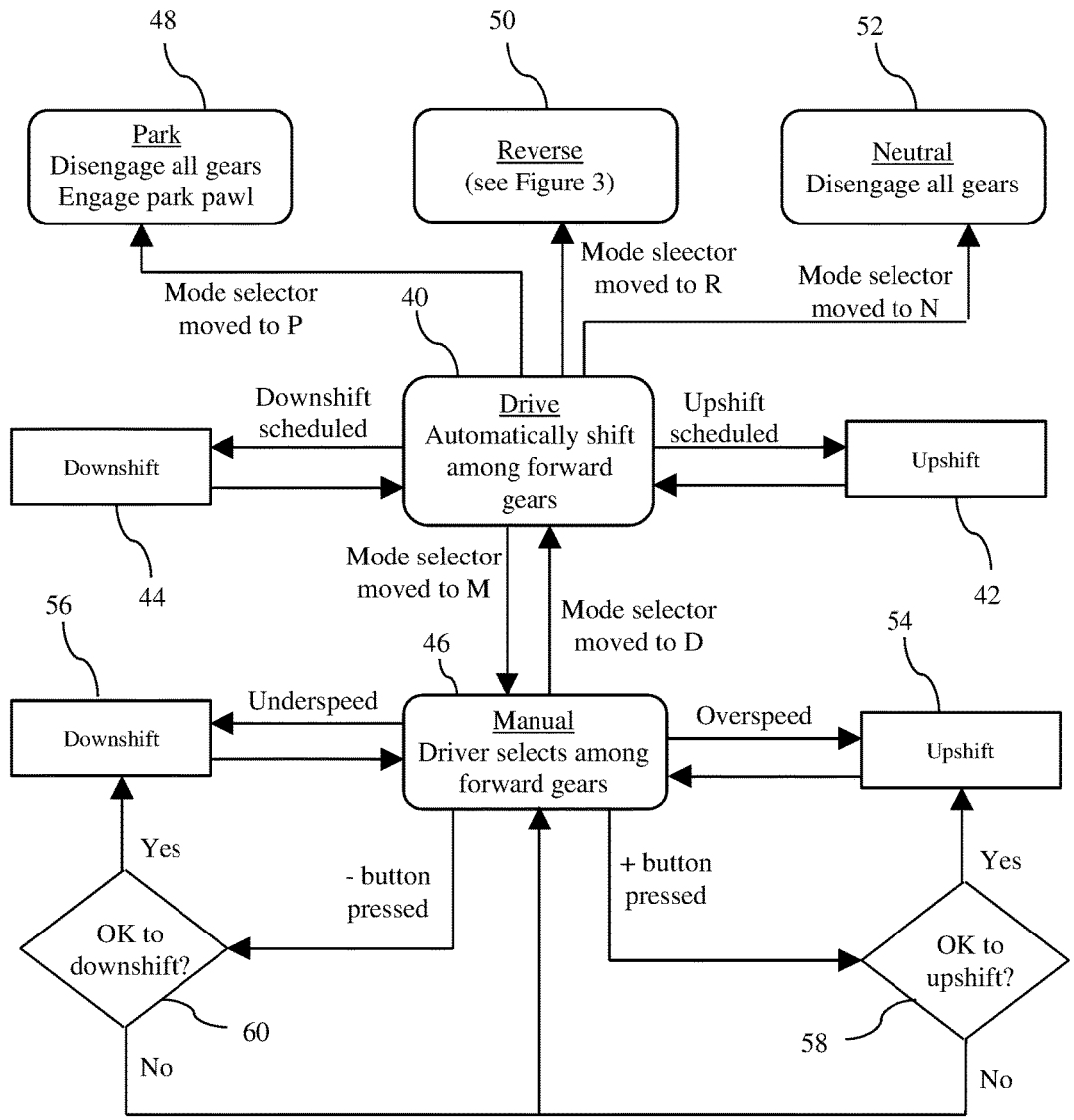
FIG. 2 is a flowchart illustrating control of the powertrain of FIG. 1 in a Drive and a Manual mode.

FIG. 2 illustrates the operation of the transmission in Drive and Manual modes. The controller enters Drive state in response to the driver selecting Drive mode via the mode selector 24. Two types of event may occur while in Drive state 40: shift scheduling and mode selection by the driver. (Other types of events may occur, but they are ignored.) If an upshift is scheduled, the controller issues the proper commands to the transmission to complete an upshift at 42 then returns to Drive mode 40. Similarly, if a downshift is scheduled, the controller issues the proper commands to complete a downshift at 44 and then returns to Drive state 40. If the mode selector is moved to the M position, the controller transitions to Manual state 46 without changing the transmission gear. If the mode selector is moved to the P, R, or N positions, the controller transitions to Park state 48, Reverse state 50, or Neutral state 52 respectively. Operation in Reverse state 50 is described in detail in FIG. 3 and below. Operation in Park state 48 and Neutral state 52 are conventional.

Three types of events may occur while in Manual state 46: speed events, shift paddle activations, and movement of the mode selector. If the mode selector is moved to the D position, the controller transitions to Drive state 40. The mode selector may be configured such that the only position that can be directly selected from the M position is the D position. Selecting other modes may require first moving the mode selector to the D position. An overspeed event is generated if the engine speed exceeds a threshold, for example if the engine is nearing the engine's maximum rated speed (redline). In response, the controller issues the commands for an upshift at 54 and then returns to Manual state 46. An underspeed event is generated if the engine speed decreases to less than a threshold such that an engine stall is likely. In response, the controller issues the commands for a downshift at 56 and then returns to Manual state 46. If the driver presses the + button, the controller checks at 58 whether an upshift is allowed. An upshift might not be allowed, for example, if the transmission is already in top gear or an upshift would cause the engine speed to become less than a threshold. If the check is satisfied, the controller commands an upshift at 54 and then returns to Manual state 46. If the check fails, the controller returns to Manual state 46 without commanding a gear change. Similarly, if the driver presses the – button, the controller checks at 60 whether a downshift is allowed. A downshift might not be allowed, for example, if the transmission is already in 1st gear or a downshift would cause the engine speed to become too high. If the check is satisfied, the controller commands a downshift at 56 and then returns to Manual state 46. If the check fails, the controller returns to Manual state 46 without commanding a gear change.

Figure 3:
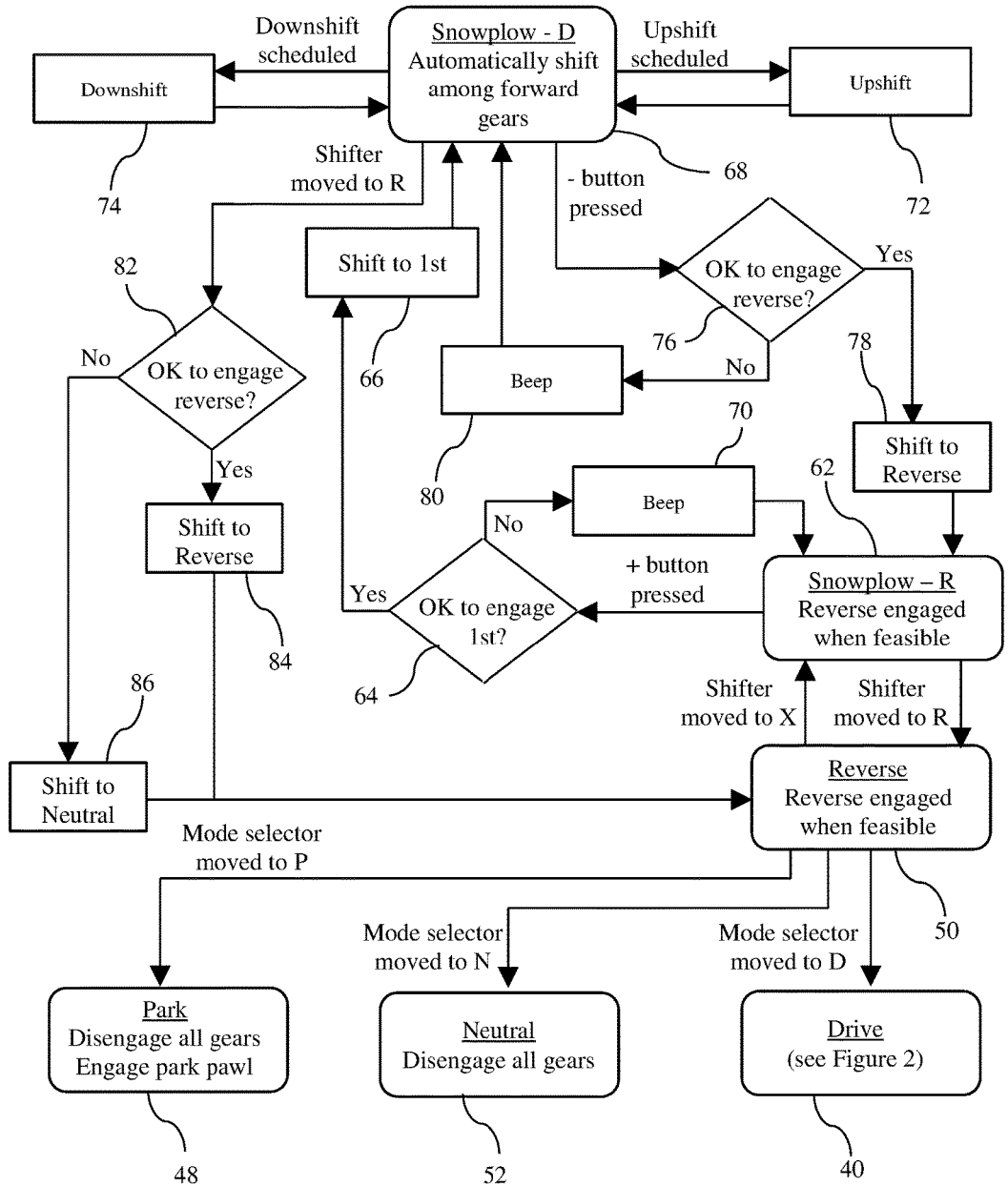
FIG. 3 is a flowchart illustrating control of the powertrain of FIG. 1 in a Reverse and a Snowplow (X) mode.

FIG. 3 illustrates the operation of the transmission in Reverse and Snowplow modes. The controller enters Reverse state 50 in response to the driver selecting Reverse mode via the mode selector 24 as described above. Upon entering Reverse state 50 from Drive, Neutral, or Park states, the controller commands a shift into Reverse as soon as doing so would not pose problems (such as when the vehicle is moving forward above a threshold speed). The only event of interest while in Reverse state 50 is mode selection by the driver. If the mode selector is moved to the X position, the controller transitions to Snowplow-R state 62 without changing the transmission gear. If the mode selector is moved to the P, R, or N positions, the controller transitions to Park state 48, Reverse state 50, or Neutral state 52 respectively and shifts accordingly. Operation in Drive state 50 proceeds as described in detail in FIG. 2 and above. Operation in Park state 48 and Neutral state 52 are conventional.

Two types of events may occur while in Snowplow-R state 62: activation of the + button and movement of the mode selector into the R position. If the mode selector is moved to the R position, the controller transitions to Reverse state 50. The mode selector may be configured such that the only position that can be directly selected from the X position is the R position. Selecting other modes may require first moving the mode selector to the R position. If the driver presses the + button, the controller checks at 64 whether shifting into $1^{st}$ gear is allowed. Such a shift might not be allowed, for example, if the transmission is moving backwards too rapidly. If the check is satisfied, the controller commands a shift to $1^{st}$ gear at 66 and transitions to Snowplow-D state 68. If the check fails at 64, the controller returns to Snowplow-R state 62 without commanding a gear change. The controller may sound an aural warning or otherwise inform the driver at 70.

In Snowplow-D state, the controller shifts among the forward gears according to the shift scheduling logic as indicated at 72 and 74. In some embodiments, the parameters that define shift points may have slightly different values in Snowplow-D mode than for normal driving. If the – button is pressed while in Snowplow-D state, the controller checks at 76 whether shifting into reverse gear is allowed. Such a shift might not be allowed, for example, if the transmission is moving forward too rapidly. If the check is satisfied, the controller commands a shift to reverse at 78 and transitions to Snowplow-R state 62. If the check fails at 76, the controller returns to Snowplow-D state 68 without commanding a gear change and may sound an aural warning or otherwise inform the driver at 80.

If the driver moves the mode selector to R while in Snowplow-D mode 68, the controller checks at 82 whether a shift to reverse is allowed using similar logic to that of 76. If the check is satisfied, the controller commands a shift to reverse at 84 and transitions to Reverse state 50. If the check at 82 fails, the controller instead commands a shift to neutral at 86 before transitioning to Reverse state 50. In that event, the controller will complete the shift into reverse when conditions change such that the shift can be accomplished.

The X position is useful for operations that require frequent direction changes, such as snowplowing, dump truck operations, mining operations, and cable installation. For example, a pickup truck owner may contract to clear a number of parking lots in various locations around a city. The driver would typically use the P, R, and D positions in the traditional manner to drive between the various parking lot locations. Upon reaching a parking lot to be cleared, the driver moves the mode selector to the R position and then into the X position. While the mode selector is in the X position, the driver selects forward by activating the + shift paddle and selects reverse by activating the – shift paddle. In this manner, the driver does not need to remove his or her hands from the steering wheel to change directions. Upon completing a parking lot, the driver moves the mode selector to the R position and then to the D position to drive to the next location.

In some conditions, the driver may desire more control over the selection of forward gear ratios. For example, when driving through hilly regions, the driver may want to select a lower gear to coast down a hill than the automatic shift schedule would select. In such a situation, the driver moves the mode selector from the D position into the M position. While in the M position, the driver commands upshifts by activating the + shift paddle and commands downshifts by activating the – shift paddle. To return to automatic shift scheduling, the driver moves the mode selector back to the D position.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    a transmission implementing a reverse gear and multiple forward gears;
    a driver interface including a mode selector and two shift buttons; and
    a controller programmed to,
        only in response to selection of a first mode via the mode selector, command shifts between the reverse gear and one of the forward gears in response to activation of the shift buttons, and
        in response to selection of a second mode via the mode selector, command shifts among only the forward gears in response to activation of the shift buttons.

2. The vehicle of claim 1 wherein the mode selector comprises a shift lever having a park position, a reverse position, a neutral position, a drive position, and a fifth position for selecting the first mode.

3. The vehicle of claim 2 wherein the mode selector has a sixth position and the controller is further programmed to command shifts among the forward gears in response to activation of the shift buttons when the mode selector is in the sixth position.

4. The vehicle of claim 1 wherein the two shift buttons are located close enough to a steering wheel to permit activation of the shift buttons without releasing the steering wheel.

5. The vehicle of claim 4 wherein the two shift buttons comprise a first paddle located on a left side of the steering wheel and a second paddle located on a right side of the steering wheel.

6. The vehicle of claim 1 wherein the transmission is a step ratio transmission.

7. A vehicle controller comprising:
    input channels configured to receive signals from two shift buttons and a mode selector;
    output channels configured to send signals to a transmission; and
    control logic configured to, only in response to selection of a first mode via the mode selector, issue commands to the transmission to shift between a reverse gear and a forward gear in response to activation signals from the shift buttons, and in response to selection of a second mode via the mode selector, issue commands to the transmission to shift only among a plurality of forward gears in response to activation signals from the shift buttons.

8. The vehicle controller of claim 7 wherein the signal from the mode selector alternately indicates selection among a park position, a reverse position, a neutral position, a drive position, and a fifth position for selecting the first mode.

9. The vehicle controller of claim 7 wherein the signal from the mode selector alternately indicates selection among a park position, a reverse position, a neutral position, a drive position, a fifth position for selecting the first mode, and a sixth position for selecting the second mode.

10. A method of controlling a transmission comprising:
switching between a first driver selected mode (M) and a second driver selected mode (X) in response to driver movement of a mode selector; and
in response to being in the first driver selected mode, commanding, by a controller, shifts among a plurality of forward gears in response to activation of shift buttons; and
only in response to being in the second driver selected mode, commanding, by the controller, shifts between one of the forward gears and a reverse gear in response to activation of the shift buttons.

11. The method of claim 10 further comprising, switching between the first driver selected mode (M), the second driver selected mode (X), and a third driver selected mode (D) in response to driver movement of the mode selector; and
in the third driver selected mode, commanding, by the controller, shifts among the plurality of forward gears in response to changes in a vehicle speed or an accelerator pedal position.

* * * * *